United States Patent
Begeja et al.

(10) Patent No.: US 7,280,965 B1
(45) Date of Patent: Oct. 9, 2007

(54) SYSTEMS AND METHODS FOR MONITORING SPEECH DATA LABELERS

(75) Inventors: Lee Begeja, Gillette, NJ (US); Richard Vandervoort Cox, New Providence, NJ (US); Harris Drucker, Long Branch, NJ (US); David Crawford Gibbon, Lincroft, NJ (US); Allen Louis Gorin, Berkeley Heights, NJ (US); Patrick Guy Haffner, Atlantic Highlands, NJ (US); Steven H. Lewis, Middletown, NJ (US); Zhu Liu, Marlboro, NJ (US); Mazin G. Rahim, Warren, NJ (US); Bernard S. Renger, New Providence, NJ (US); Behzad Shahraray, Freehold, NJ (US)

(73) Assignee: AT&T Corp., New York, NY (US)

( * ) Notice: Subject to any disclaimer, the term of this patent is extended or adjusted under 35 U.S.C. 154(b) by 927 days.

(21) Appl. No.: 10/407,565

(22) Filed: Apr. 4, 2003

(51) Int. Cl.
*G10L 21/00* (2006.01)

(52) U.S. Cl. ...................................... 704/257
(58) Field of Classification Search ................. 704/257
See application file for complete search history.

(56) References Cited

U.S. PATENT DOCUMENTS

| | | | |
|---|---|---|---|
| 6,925,154 B2 * | 8/2005 | Gao et al. ................. | 379/88.03 |
| 7,092,888 B1 * | 8/2006 | McCarthy et al. .......... | 704/277 |
| 7,149,687 B1 * | 12/2006 | Gorin et al. ................. | 704/243 |

* cited by examiner

*Primary Examiner*—Susan McFadden (57) ABSTRACT

Systems and methods for monitoring labelers of speech data. To test or train labelers, a labeler is presented with utterances that have already been identified as belonging to a particular class or call type. The labeler is asked to assign a call type to the utterances. The performance of the labeler is measured by comparing the call types assigned by the labeler with the existing call types of the utterances. The performance of a labeler can also be monitored as the labeler labels speech data by occasionally having the labeler label an utterance that is already labeled and by storing the results.

24 Claims, 7 Drawing Sheets

SYSTEMS AND METHODS FOR MONITORING SPEECH DATA LABELERS

BACKGROUND OF THE INVENTION

1. The Field of the Invention

The present invention relates to systems and methods for monitoring speech data labelers. More particularly, the present invention relates to systems and methods for using an interactively generated annotation guide to train and test speech labelers.

2. Introduction

Dialog applications are applications that are often used to automate the process of receiving and responding to customer inquiries. Dialog applications use a combination of voice recognition modules, language understanding modules, and text-to-speech systems to appropriately respond to speech input received from a user or a customer. Billing inquiries, information queries, customer complaints, and general questions are examples of the speech input that is received by dialog applications. The response of the dialog application to a particular speech input depends on the logic of the dialog application.

The development of a successful dialog application, however, is a time-consuming process and requires a significant amount of manual labor because of the nature of the tasks being performed. One of the tasks performed in the development of a dialog application is the generation of an annotation guide that is used to annotate or label raw speech data. The annotation guide is generally created by a user experience person (or other user) that is familiar with the purposes and goals of the dialog application. Becoming familiar with the purposes and goals of the dialog application is also a labor-intensive process.

Currently, the generation of an annotation guide requires the user experience person to examine the raw speech data and create the categories, call types, and examples that are usually included in the annotation guide. The annotation guide aids the development of a dialog application because the annotation guide is used by labelers to classify the raw speech data with the call types defined by the user experience person in the annotation guide.

After the annotation guide is developed, labelers begin using the annotation guide to label the speech data. Because the speech data may contain thousands of different utterances, labeling the speech data using the annotation guide is a labor-intensive process that is usually performed by more than one labeler. Unfortunately, human labelers do not always interpret the annotation guide in the same way or they may not understand the contents of the annotation guide. As a result, one labeler may classify a particular utterance as being of a particular call type while another labeler may classify the same utterance as being of a different call type. Labeling problems become more pronounced when labelers attempt to label utterances that do not clearly fit in a particular call type.

For example, an annotation guide may describe a Pay_Bill call type used to label utterances that suggest the customer wants to pay his or her bill. The following utterances from raw speech data, for instance, should be labeled with the Pay_Bill call type:

I want to pay a bill; and

I got mail and I have my credit card ready.

The second example of "I got mail and I have my credit card ready" is a marginal example that is more difficult to classify that the first example of "I want to pay a bill." It is possible that one labeler will correctly label the second example with the Pay_Bill call type while another labeler will incorrectly label the second example with a different call type.

The likelihood of a particular utterance being labeled incorrectly increases if the labeler is not trained or tested. Currently, speech labelers (annotators) manually use the annotation guide to label the speech data and this process is error-prone. The performance of the labelers cannot be tracked and it is difficult to determine whether similar utterances are being classified in the same way by different labelers.

The ability to properly label the raw speech data ultimately has a significant impact on whether the dialog application can respond to speech input appropriately. If incorrectly labeled or annotated speech data is used to train portions of the dialog application such as the natural language understanding modules, the dialog application will clearly not function properly and will frustrate customers. There is therefore a need for systems and methods to train and test the labelers to help insure that the utterances in the speech data are being labeled appropriately.

BRIEF SUMMARY OF THE INVENTION

These and other limitations are overcome by the present invention, which relates to systems and methods for monitoring speech data labelers and more particularly to training and testing speech data labelers. An annotation guide is used to label or annotate a corpus of speech data and plays an important role in the development of a dialog application. After the annotation guide is developed, it is used by labelers to annotate or label the speech data by assigning a call type defined in the annotation guide to the unlabeled utterances in the speech data. The labeled speech data is then used to train, for example, natural language understanding models.

During the development of the annotation guide, the user experience person that creates the annotation guide identifies multiple utterances as belonging to a particular call type. Some of these utterances identified by the user experience person are included in the annotation guide as positive examples of the particular call type. The user experience person similarly identifies utterances that are negative examples of the particular call type and are expressly excluded from a particular call type. These utterances are stored and used as a source of labeled utterances even if they are not included in the annotation guide.

In one embodiment of the present invention, labelers are tested using the labeled utterances that were identified by the user experience person as being of a particular call type. For example, the labeler is presented with an utterance and asked to identify the appropriate call type for that utterance. The labeler typically has access to the annotation guide as the labeler labels these utterances. After the labeler selects a call type for the utterance, the call type selected by the labeler is compared with the call type identified by the user experience person. This process is repeated for a series of utterances to determine if the labeler can properly label the utterances in the speech data. As the labeler is tested and/or trained, the labeler thus gains an understanding of the contents of the annotation guide as well as the ability to recognize which call type should be assigned to an utterance in the speech data.

In another embodiment of the present invention, the labeler is trained to label the utterances interactively. For example, a series of labeled utterances may be presented to the labeler along with the call type associated with the series of labeled utterances. Then, the labeler is presented with an utterance and asked to determine if the utterance should be included in the same call type. The labeler can access the annotation guide to look at the examples included in the call type, review the other examples that were previously displayed to the labeler, and the like. In one example, the labeler may also be able to analyze the speech data to find other utterances that are similar to the utterance being considered by the labeler.

The present invention also permits a labeler to be monitored as the labeler assigns call types to unlabeled speech data. In this case, a labeled utterance is occasionally presented to the labeler instead of an unlabeled utterance. The call type assigned by the labeler is compared with the existing call type of the labeled utterance. In this manner, the performance of a labeler can be checked and measured over time.

Training and testing labelers promotes consistency among the labelers and insures that the labelers are proficient at labeling utterances. Another advantage of the present invention is that the effectiveness of the annotation guide can also be gauged. For example, a particular annotation guide may be flawed if an otherwise proficient labeler begins to have difficulty labeling speech data.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 4 illustrates an exemplary embodiment of a screen shot that illustrates the generation of classes that are included in an annotation module;

DETAILED DESCRIPTION OF THE PREFERRED EMBODIMENTS

Dialog applications help automated systems to receive and respond to client input or speech. The speech is recognized using an automatic speech recognition system and interpreted using a natural language system. The dialog application then generates a response based on what is understood by the natural language system. Dialog applications are used to automate, for example, call centers by receiving customer calls and either automatically handling the customer inquiry or by directing the customer to an appropriate person within the call center.

Figure 1:
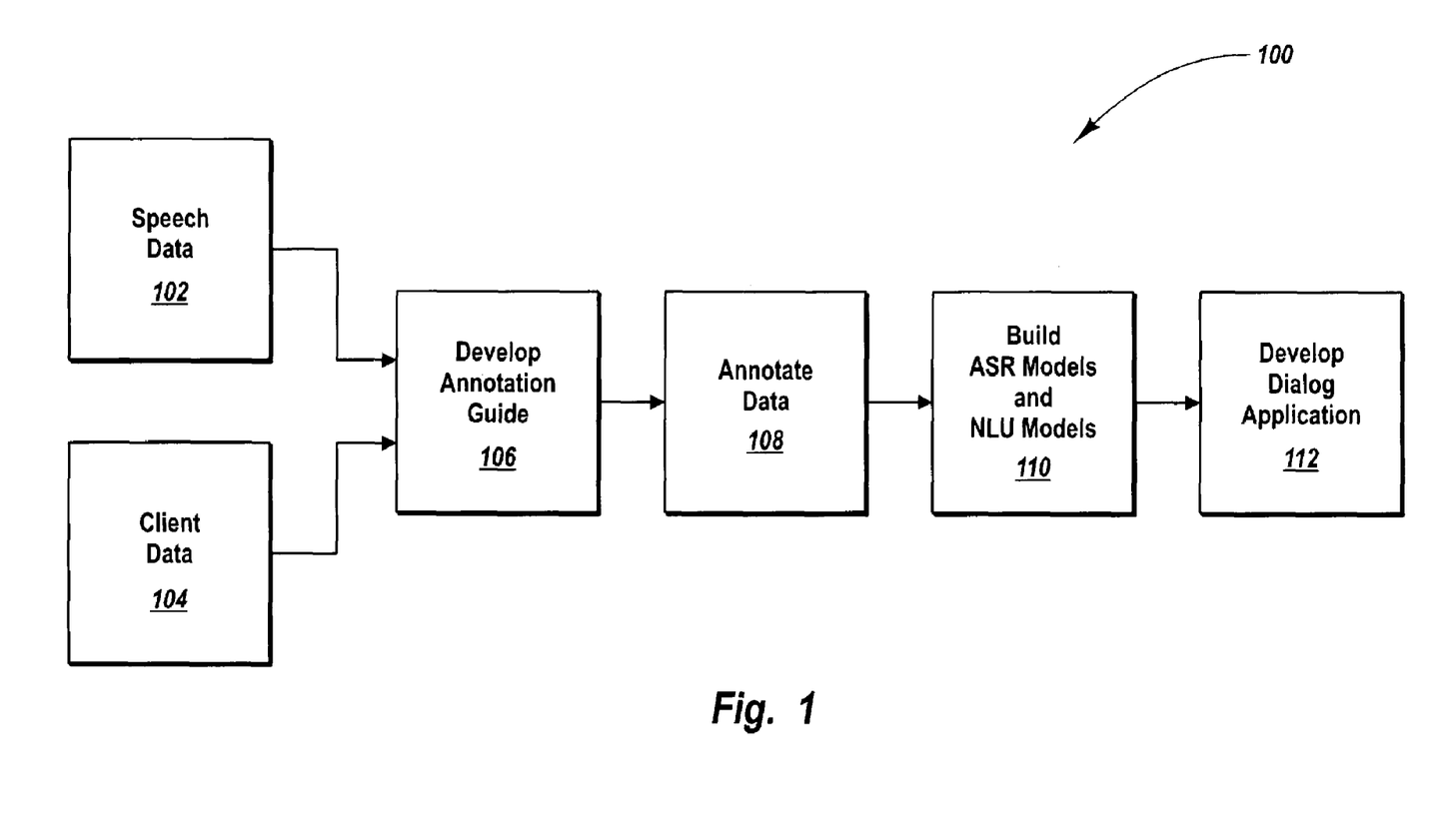
FIG. 1 illustrates is a block diagram that illustrates an exemplary method for creating a dialog application.

As previously mentioned, the development of a dialog application can be a time-consuming process and FIG. 1 illustrates an example of a process that is used to develop a dialog application. The development of a dialog application often begins with the collection and transcription of the speech data 102. The speech data 102 corresponds to utterances that are likely to be experienced by the dialog application.

In addition to the speech data 102, it is useful to collect client data 104 as well. Collecting the client data 104 includes obtaining an understanding of the business that desires a dialog application and ascertaining the purpose and goals that the dialog application should achieve. Collecting the client data 104 is labor-intensive and it is advantageous to work closely with the business to fully understand what the business wants to automate in the dialog application. The user experience person that creates the annotation guide is typically involved in the collection of the client data 104 because the categories and call types that are ultimately included in an annotation guide are often derived by the user experience person from the client data 104 and the speech data 102.

After the client data 104 and the speech data 102 are collected, an annotation guide is developed (106) by a user experience person or other user. Often, the development of the annotation guide can occur concurrently with the collection and transcription of the speech data. When the annotation guide is complete, the speech data is annotated (108). Next, automatic speech recognition (ASR) models and natural language understanding (NLU) models are constructed and trained (110) using the annotated speech data as well as the raw speech data. Finally, the dialog application is developed (112) and prepared for testing and/or use by the business.

One advantage of the present invention is that it promotes consistency among the labelers that are labeling the speech data. In one embodiment, utterances identified by the user experience person during the development of the annotation guide are used to train and test the labelers before or while they label the speech data. As a result, different labelers are likely to label similar utterances with the same call type. Another advantage is that labelers that cannot consistently label speech data correctly can be identified and given more training. Because the systems and methods of the present invention promote more consistent and more accurate labeling, the dialog application is more efficient and able to respond to speech input more accurately. This increases customer satisfaction and lowers cost.

In another embodiment, weaknesses in the annotation guide can also be identified based on the performance of the labelers. For example, when labelers that accurately label speech data on a consistent basis begin to label speech data incorrectly, there may be a problem with the annotation guide. A poorly designed annotation guide can adversely affect the development of a dialog application just as incorrectly labeled speech data can adversely affect the development of the dialog application.

Figure 5:
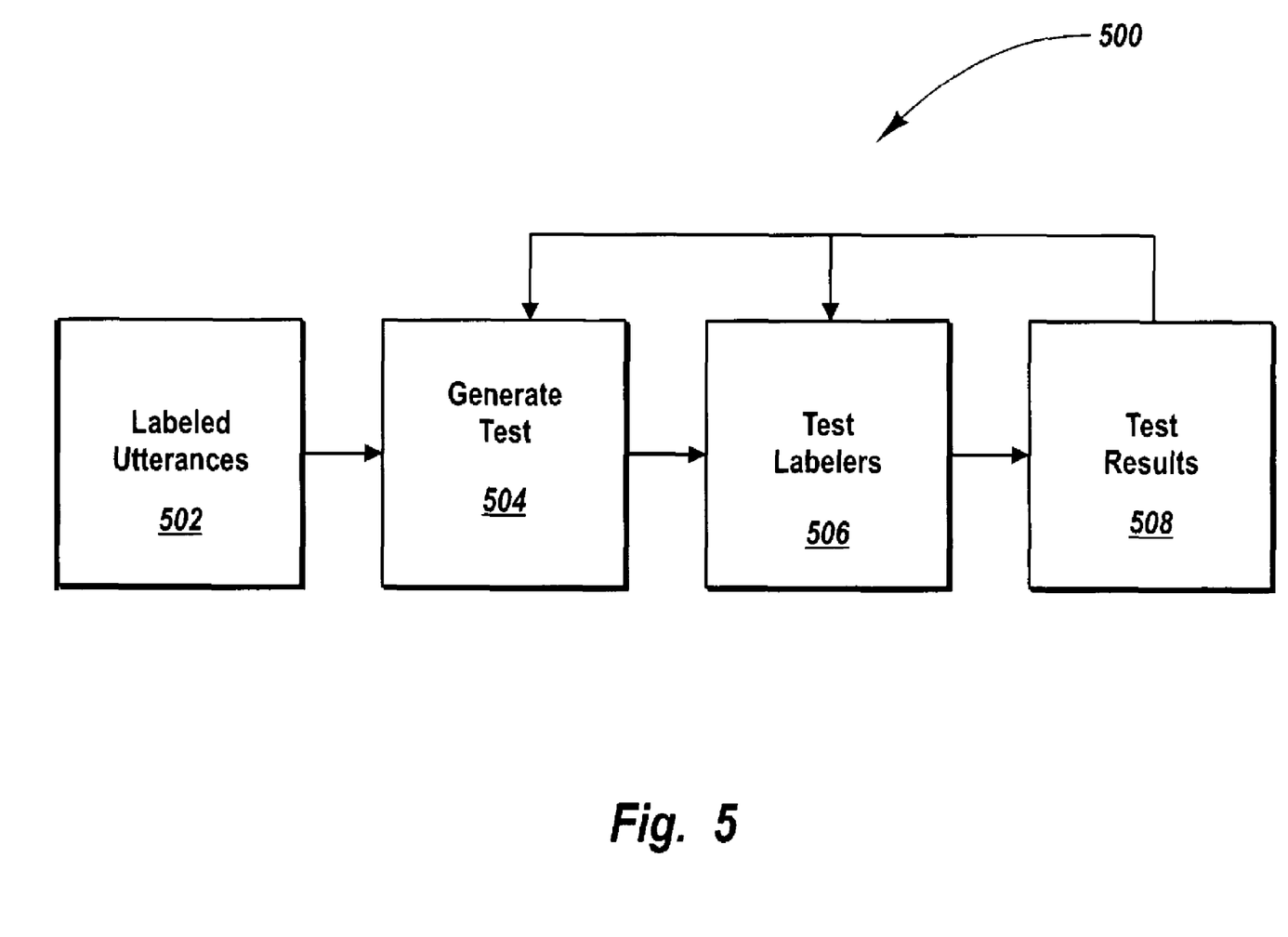
FIG. 5 illustrates an example of a method for testing or training a labeler using labeled utterances.
Figure 6:
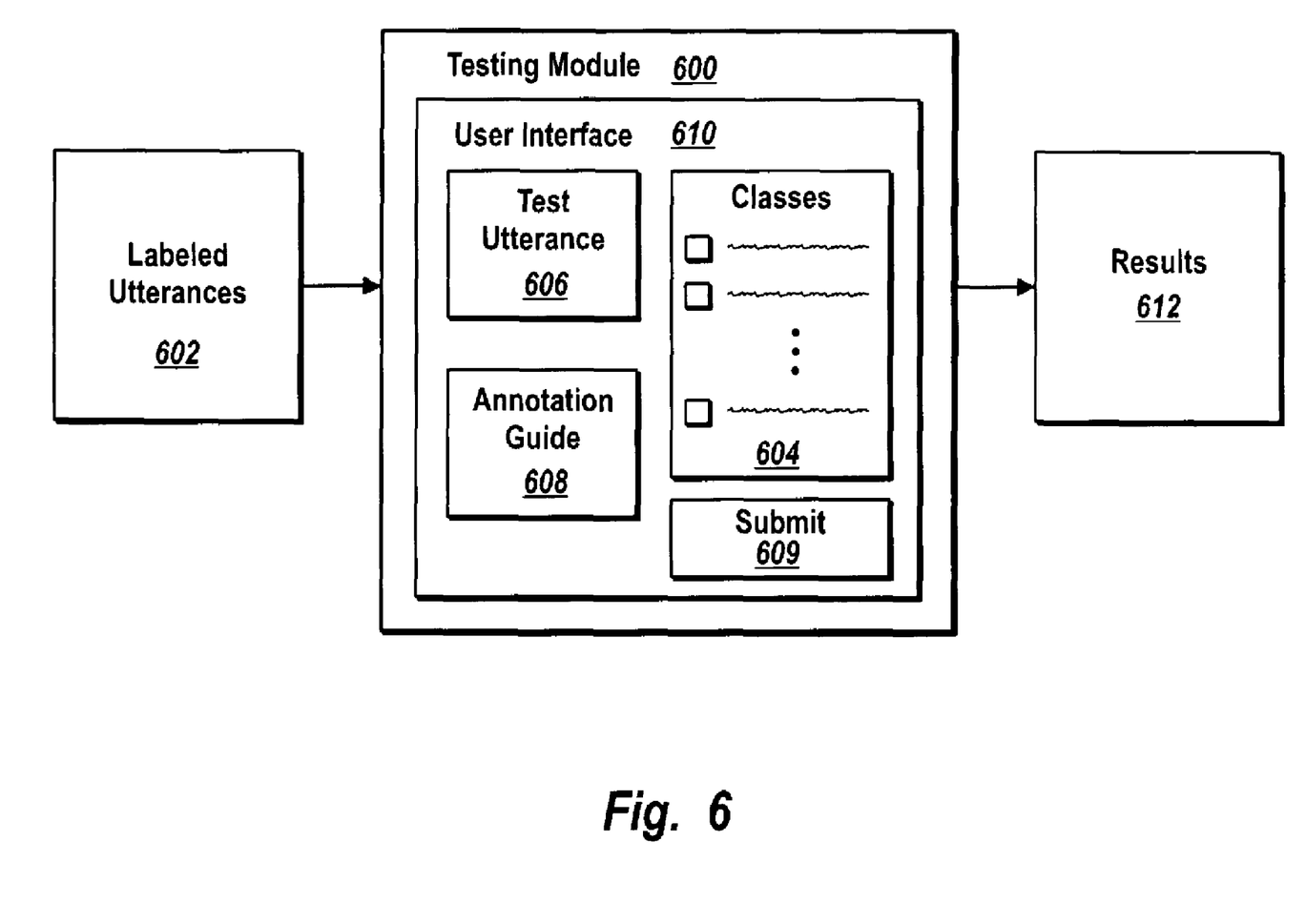
FIG. 6 illustrates another example of a method for training or testing a labeler to label utterances.
Figure 7:
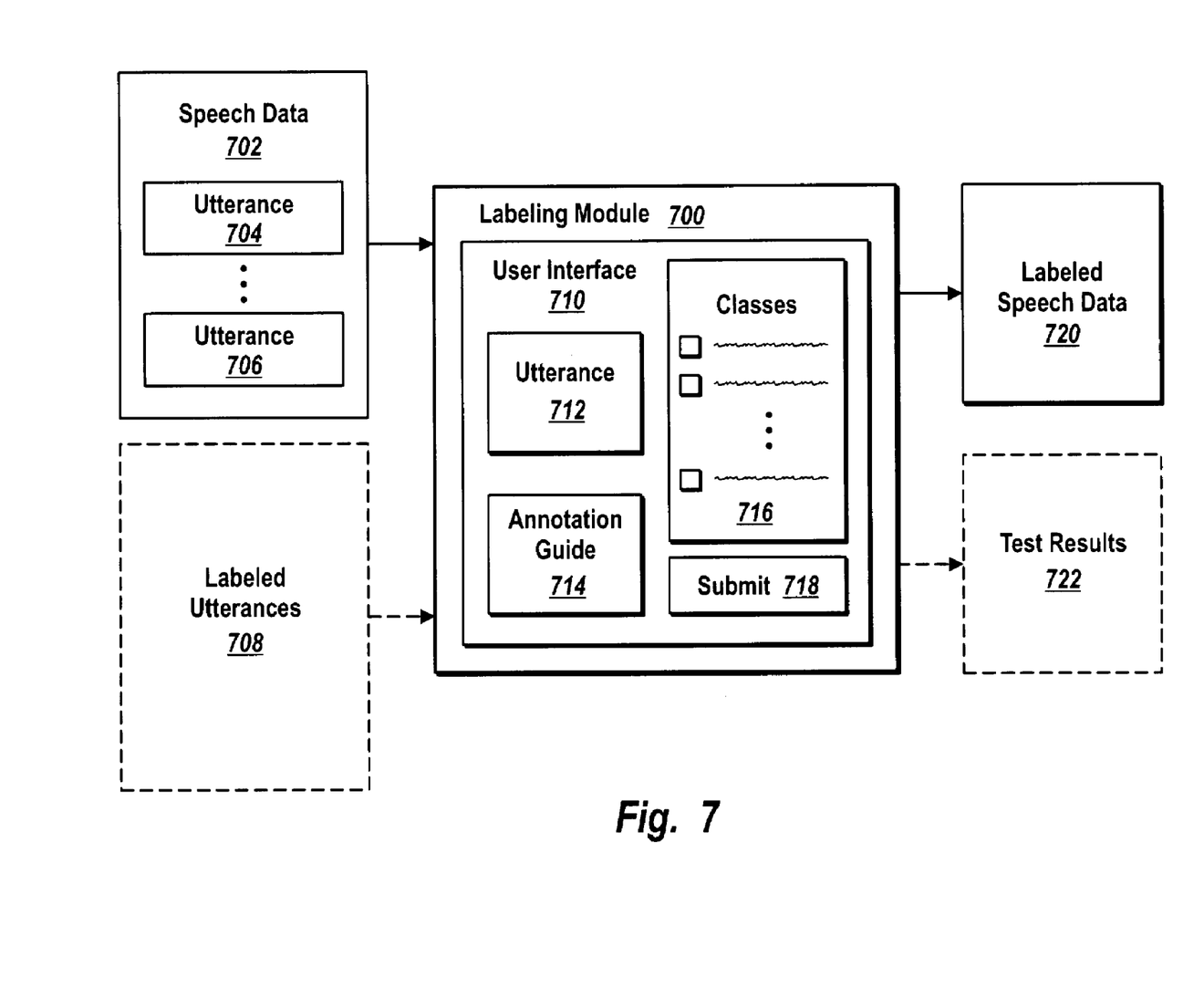
FIG. 7 illustrates yet another example of a method for monitoring the ability of a labeler to label speech data.

Because the annotation guide has a role in training and testing the labelers, FIGS. 1-4 provide an exemplary description of the development of an annotation guide. FIGS. 5-7 illustrate examples of how the annotation guide or data collected during the development of the annotation guide are used to monitor the labelers that label or annotate speech data.

The development of an annotation guide typically begins by analyzing the speech data in a manner that permits the user (user experience person) to include (or reject) utterances that should be included (or rejected) from a working class that the user has preliminarily identified. Potential utterances are presented to the user and the user identifies or selects the utterances that should be included in the working class. For purposes of training and testing labelers, the utterances selected or identified by the user as belonging to a particular call type or class are usually stored or collected as labeled utterances. These labeled utterances, in one embodiment, may be used to train and test labelers because they were associated with specific call types by the creator of the annotation guide.

Figure 2A:
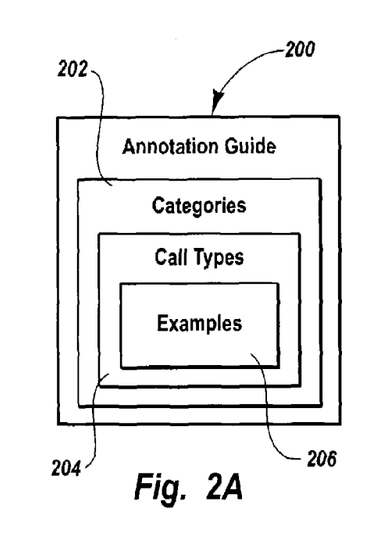
FIG. 2A illustrates an exemplary annotation guide.

FIG. 2A is a block diagram that illustrates an exemplary annotation guide that is used to annotate a corpus of speech data. The annotation guide 200 provides instructions to labelers. The speech data annotated or labeled by the labelers is used to train natural language models. The annotation guide 200 is often a text or word processing file, paper document, spreadsheet, or electronic document that is used as a reference for labeling the utterances in the speech data.

The annotation guide 200 includes categories 202, which are often divided into multiple call types 204. The examples 206 of a particular call type usually include positive examples of utterances that belong to the call type as well as negative examples of utterances that do not belong to the call type. The call types 204 may also be referred to herein as classes. The annotation guide 200 is typically used in the annotation of speech data that corresponds to telephone calls or utterances received over the telephone. However, the annotation guide may also be used to label utterances that were not telephone calls. The annotation guide can be used to classify electronic messages such as chat and email. In other words, the annotation guide can be used to classify audio, text, transcribed speech, and the like. This enables a dialog application, for example, to respond to customer inquiries that are submitted over the Internet using email or chat, for example. Instead of generating a speech response over the telephone, the dialog application generates an email response or a chat response.

For example, a business that is involved with prescription drugs may receive customer inquiries relating to prescription orders, billing questions, and the like. The client data includes information about the prescription drug business and helps identify what the business wants to automate in a dialog application. An annotation guide for this business includes several categories of call types that are related to the types of calls received by the business. One category of call types may be a service category that is related to inquiries about prescription orders or plan details. Another category of call types may be a billing category that is related to customer inquiries about billing, payment, or costs. One of skill in the art can appreciate that an annotation guide can describe multiple categories and call types and each annotation guide is not required to have the same categories or call types.

The call types, in one embodiment, are generally represented as: Verb(Object). Exemplary verbs include, but are not limited to: ask, cancel, change, combine, and the like. The object relates to a specific call type. The selection or choices of verbs and objects is often specific to a particular business and to the goals that the dialog application is intended to achieve.

Using this format to represent the call types 204, the service category may include an Ask(Info) call type, an Ask(Insurance) call type, a Cancel(Miscellaneous order) call type, and the like. One of skill in the art can appreciate that a large number of different categories and call types can be defined and created by a user experience person.

In each call type, the annotation guide 200 usually includes examples 206. For instance, the Change(Credit Card) call type, which may in the billing category, may include the following positive examples:
   yes I need to change the credit card number in my account
   uh I have credit cards on my plan and I want to remove them The Change(Credit Card) call type may also include the following negative examples:
   I just received a bill and I thought you were supposed to charge the amount on my card (Use Verify(Credit Card) call type)

Using the annotation guide, a labeler labels other utterances in the speech data that are like the positive examples as being of a particular call type. The negative examples for a particular category may even identify the appropriate call type as illustrated above.

Figure 2B:
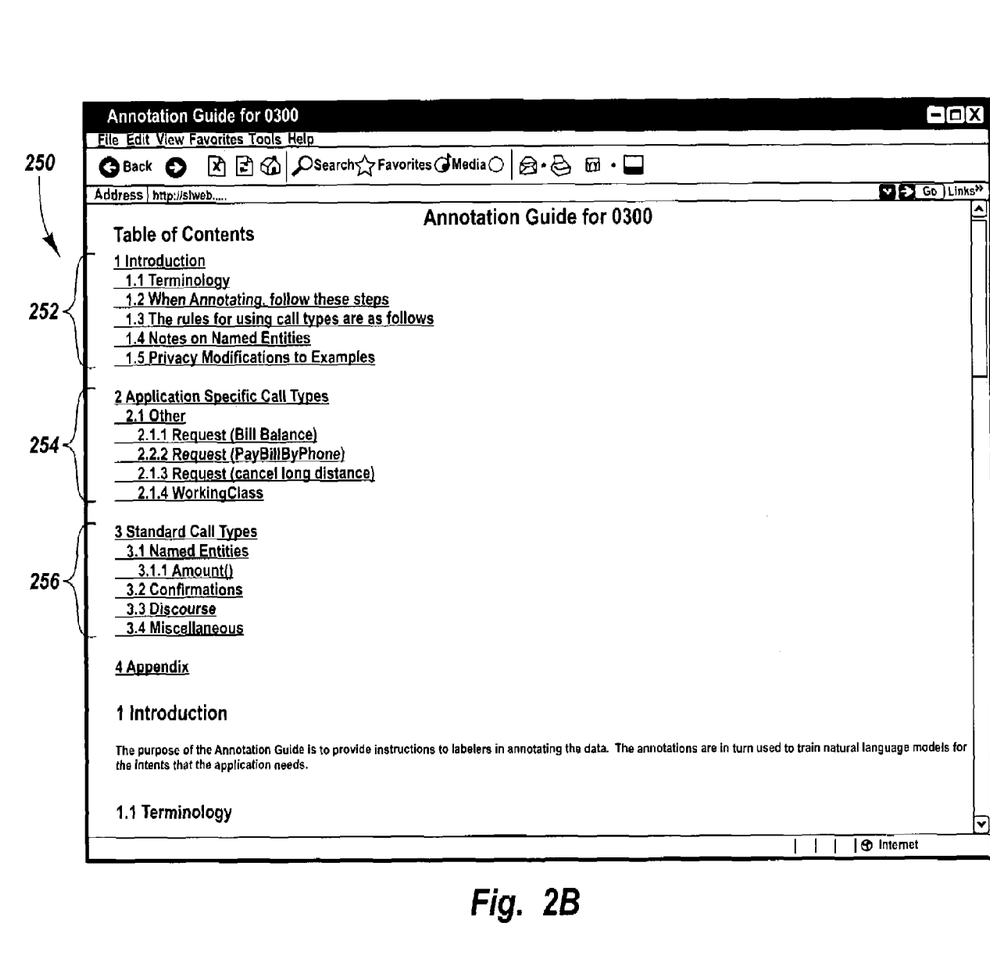
FIG. 2B illustrates the table of contents for one embodiment of an online version of an annotation guide.

FIG. 2B illustrates a Table of Contents for an exemplary annotation guide. In this example, the table of contents 250 includes an introduction section 252 that references terminology, annotation instructions, and the like of the annotation guide. The section 254 references categories and call types that are specific to a particular dialog application. The section 256 references categories and call types that can be standard across multiple dialog applications.

The following example further illustrates an example of a call type that might be described in an annotation guide. This example illustrates the specific call type Ask(Info) in the service category and provides information that permits labelers to appropriately label utterances such that a natural language model can be trained to respond to this call type. This example illustrates both a category and one call type within the category.
  2. Service Category: Ask( )—General or Vague
  The Ask( ) call types are used for vague or very general, non-specific questions or requests.
    2.1 Ask(Info)—Vague
    The vague label for callers asking for information, without stating the specific information they want.
    Use Ask(Info) Examples:
    1. yes I have a problem
    2. I need information
    3. I have a question
    Do NOT use Ask(Info) Examples:
    1. I need an address (Use Request(MailingAddress))
    2. What do I do with my prescription Using the annotation guide, a labeler annotates or labels speech data and assigns at least one call type to each utterance in the speech data.

Figure 3:
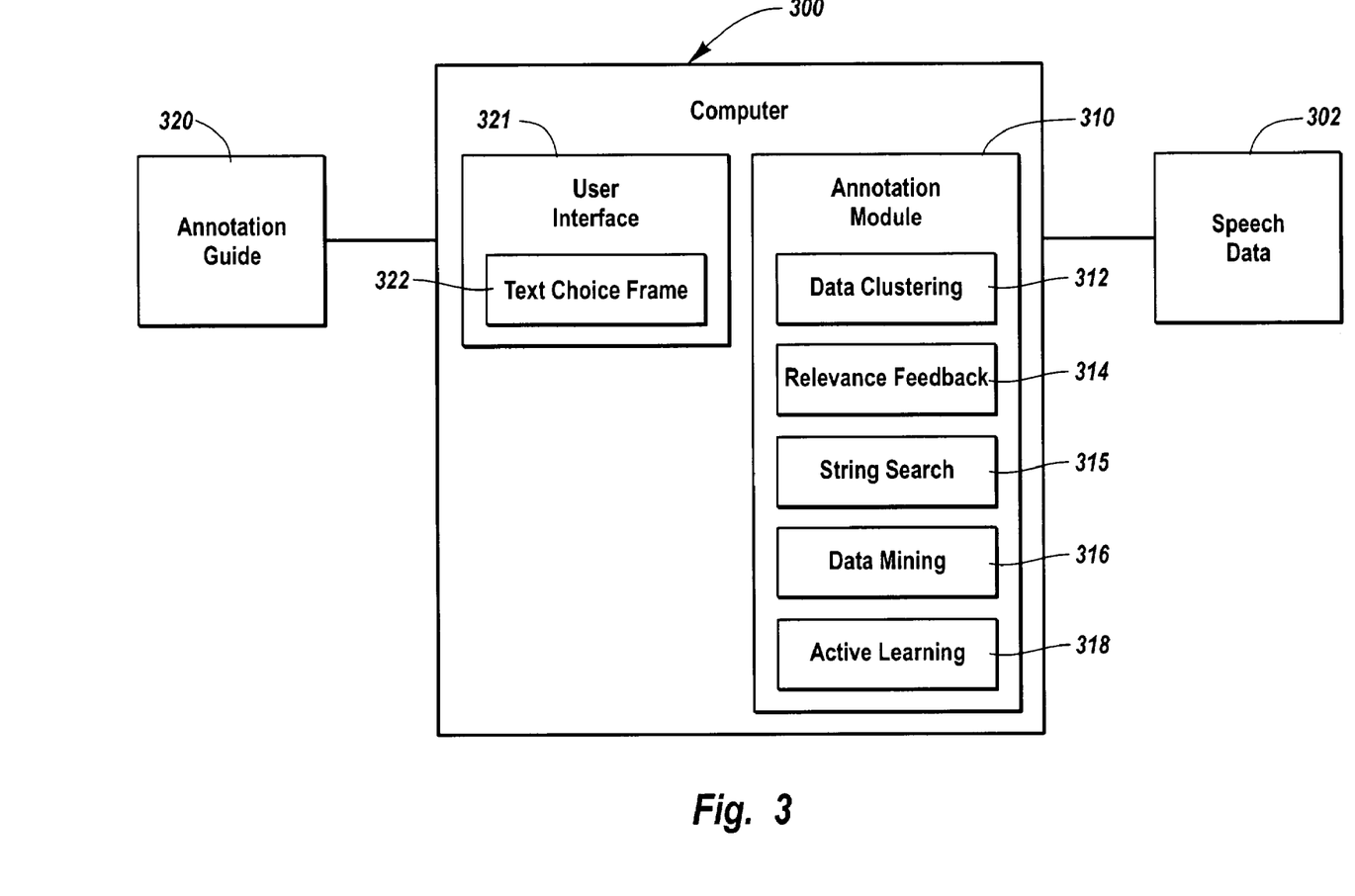
FIG. 3 illustrates one embodiment of an annotation module used to generate an annotation guide.

FIG. 3 illustrates an annotation module that reduces the time required to generate an annotation guide and is used interactively or automatically to generate an annotation guide. The annotation module 310 is loaded on a computer 300 or can be accessed remotely over a network. The computer 300 in this example represents a variety of different computing configurations through which an annotation guide may be developed and generated. The computer 300, for example, may represent a network of computers or a single computer that has access to the annotation module and other resources such as the Internet, spreadsheets, and other files. The annotation module 310 may be used in conjunction with other modules or programs to facilitate accessing the relevant data. For example, the annotation module 310 may be used within a browser to access data over a network connection.

FIG. 3 also illustrates that the computer 300 generates a user interface 321 that includes a text choice frame 322 through which the utterances identified by the annotation module 310 are displayed to the user experience person. Through the text choice frame 322, a user experience person provides input that is used to further define the call types of the annotation guide 320. For example, a user experience person can provide input that selects utterances to be included in a particular call type. The input provided by a user experience person through the user interface 321 is described in more detail with regard to FIG. 4.

The annotation module 310 provides multiple data analyzing functions and modules that help the user experience person identify and define categories, call types, and examples of call types to be included in the annotation guide. In one embodiment, the annotation module 310 provides interactive tools to create and define call types. The tools can use supervised learning and/or unsupervised learning techniques.

The data clustering module 312 is a module that accesses the speech data and organizes the speech data into N groups of clusters, where N is typically selected by the user. The clusters often use word distance parameters to form the N clusters. Each cluster is associated with a value that indicates the consistency of each cluster. A user can then select a cluster and the utterances in that cluster are presented to the user. The user can easily select specific utterances or reject specific utterances for a particular call type or class. One of skill in the art can appreciate that the data clustering module 312 can also cluster the speech data using N-grams, distances between groups of words, phrases, named entities, and the like. Generally, the data clustering module 312 generates clusters of utterances that are related.

The relevance feedback module 314, in one embodiment, is used by the annotation module 310 to help find a larger group of utterances of a specific call type or class using utterances identified by a user and is an example of supervised learning in one embodiment. For example, the user can identify specific utterances as being of a particular call type and the relevance feedback module 314 can access the speech data 302 and find similar utterances. Alternatively, the relevance feedback module 314 can also be used to exclude utterances from a call type or class. More generally, the relevance feedback module 314 is able to examine actions taken by the user to better define a particular call type or class.

For example, a user experience person may review a group of utterances and identify both positive utterances and/or negative utterances from that group of utterances. The relevance feedback module 314 may use support vector machines to classify the positive utterances and/or negative utterances. Using the support vector machines, other utterances in the speech data can be ranked or assigned a probability. The relevance feedback module 314 returns the utterances that have the highest probability according to the support vector machines or other classifier. The relevance feedback module 314 can be used iteratively to further refine the utterances that are included in a particular call type. In one embodiment, the relevance feedback module 314 is used iteratively until the utterances identified by the relevance feedback module 314 are consistently in a particular call type. The relevance feedback module 314 converges on the most relevant utterances in the speech data for a particular category or call type.

The string search module 15 is a module that permits the user experience person to find utterances in the speech data 302 using a string or a string variant. For example, the user experience person may want to find all utterances that include the string "credit card" and the string search module 315 is used to find utterances in the speech data 302 that satisfy the string. The string search module can also be used to search for synonyms, string variants, and the like. The utterances found by the string search module 315 are displayed to the user.

The data mining module 316 is another module that is used to analyze and identify utterances in the speech data using various data mining techniques. The data mining module 316 uses methods that return an interesting group of utterances. The data mining module 316, for example, can utilize the metadata associated with the speech data, synonyms, query expansion methods, or other speech-related parameters. For example, the data mining module may return each utterance that was the first utterance of a conversation. Alternatively, the data mining module may return the longest utterance of a particular conversation. In addition, the data mining module 316 can use decision trees, neural networks, and the like or any combination thereof to find an interesting group of utterances in the speech data.

The active learning module 318 can track the actions of the user experience person to help formulate the call types as well as help in the development of future annotation guides and dialog applications. In addition, the active learning module 318 can be used to classify utterances that are difficult to place in a particular call type. For example, a user may select exemplary utterances (both positive and negative) of a particular call type. The active learning module 318 can construct a classifier using the exemplary utterances and then rank the utterances in the speech data using the classifier. The active learning module 318 can use support vector machines for this purpose as previously described. The active learning module 318 selects utterances that are not clearly included or excluded from a particular call type. In other words, the active learning module 318 selects marginal utterances and the marginal utterances are then presented to the user experience person. The user experience person can then make a determination as to whether the marginal utterances should or should not be in a particular call type. The active learning module 318 can also be used iteratively.

The annotation module 310 uses various modules to find additional utterances that are like a particular set of utterances or to exclude some utterances from being included in a particular set of utterances. The annotation module 310 is not limited to these modules, but may use other modules and methods for analyzing, organizing and displaying the speech data 302 in a manner that permits the annotation guide 320 to be prepared for use in annotating or labeling the speech data 302.

Generating an annotation guide typically begins when the speech data is examined by the annotation module. The annotation module analyzes the speech data using various modules previously described. After the speech data is analyzed, the user is typically presented with a group of utterances. The user provides input to select some of the utterances from the presented group of utterances through a user interface. The utterances selected in this manner may then be used as feedback by the relevance feedback module to find additional utterances that are similar to the selected utterances. When the class or call type the user is working on is completed, the class or call type is typically committed and is included in the annotation guide when the annotation guide is generated.

FIG. 4 is an example of a screen shot illustrating aspects of automatically generating an annotation guide. The screen shot of FIG. 4 illustrates identifying data 412 that describes: the speech database being used, the number of utterances or calls in the database, and a user identifier. The user has preliminarily provided identifying information 404 that includes a working class or call type and a description of the working class or call type. The identifying information 404 also provides a search box where the user can enter a string used to find utterances in the speech data. The identifying information 404 also includes a pulldown list that permits the user to select a cluster. Utterances in the cluster selected from the pulldown list are displayed to the user.

In this example, the user experience person has organized the speech data using data clustering as indicated by the title 401 of the text 402, although the speech data can be analyzed or organized using other methods as previously described. The bar chart 408 includes the bars 420, 422, and 424. The bar 420 and the bar 422 represent existing call types while the bar 424 represents the working class or call type that is not completed but is being developed using the annotation module. The height of a particular bar may represent the number of utterances that are included in the corresponding call type. The text 402 of utterances in the cluster selected by the user experience person is displayed in this example. The text 402 can correspond to an existing class or call type that is being edited or refined or to a working class or call type.

If the user experience person is developing a new call type or new working class, FIG. 4 illustrates that the user experience person can select which utterances should be in the working class as well as which utterances should be included as examples in the annotation guide by using the checkboxes that are arranged next to the displayed utterances. The checkbox 403 is checked, for example, indicating that the utterance next to the checkbox 403 should be included in the working class. If the guide example checkbox is checked but the utterance is not selected, then that utterance is included in the annotation guide as a negative example. Similarly, if an utterance is selected and the guide example checkbox is also checked, then the utterance is included in the annotation guide as a positive example.

Using the submit button 416, a user can submit the selected utterances to the working class or call type. The submit button 416 can also activate the relevance feedback such that a group of utterances that are similar to the utterances identified by the user experience person are presented to the user experience person. When a class or call type is complete, the class is committed along with the class description and the user experience person can begin working on a new class or call type. The "Add to Other Class" button 417 enables the utterances selected by the user experience person to be included in another call type.

The generate report hyperlink 418 typically generates a report relating to the annotation guide. For example, the generate report hyperlink 418 may cause a window to be displayed that contains the reports that can be generated. Exemplary reports include, but are not limited to, the current status of the working class or committed call types, a list of the utterances included in the working class or committed call types, a preliminary annotation guide, and the like. The reports can take the digital or paper form of a document. A spreadsheet, word processing file, XML file, and the like can be represented either as a digital or a paper document. The generate guide hyperlink 406 generates an annotation guide that includes the call types that have been developed and the annotation guide can also be a digital or paper document.

As previously indicated, the user experience person can analyze or organize the speech data in various manners and the text of selected utterances is displayed to the user. If the user clicks on the text of an utterance, the audio file associated with the text may be played for the user. The control buttons 414 provide other controls for the call type or class being developed. The new search button, for example, may be used to search for utterances for a new call type using a particular string or string variant. The commit button may commit a particular class to the annotation guide and automatically begin a new call type. The abandon button may be used to start a new call type without committing the current call type or class. The delete button may be used to delete a particular call type or class from the annotation guide. One of skill in the art can appreciate that other buttons can be included that perform other functions that have been described herein.

The user interface may also provide information about the speech data to assist the user experience person in developing the annotation guide. For example, the classes or call types can be compared to determine if there is overlap between the various classes or call types. Word distance, for example, can be used to determine if the overlap exists. If the call types overlap, the overlapping call types or classes can be further refined as described herein.

Also, the user interface may also display how many utterances are in a particular class as well as how many utterances are not classified. This helps insure, in one embodiment, that marginal examples can be included as examples of a particular class. For example, "I have my mail and I have my wallet" is an example of a marginal utterance that may be difficult to correctly label.

The user interface may also include a variety of different input mechanisms. For example, each utterance may be associated with multiple checkbox entries that perform particular functions. One checkbox may be used to include the utterance as an example; another checkbox may be used to exclude the utterance from the annotation guide. Another checkbox may be checked such that the checked utterance is used to seed a new search of the speech data.

The present invention also enables a user experience person to work with more than one cluster or call type at the same time. This is particularly useful when two clusters, for example, are related. In this example, the utterances from a first cluster are displayed to the user experience person. A second cluster can then be selected by the user experience person and displayed alongside the first cluster. In other words, utterances from two different call types are displayed side by side. Control buttons are provided that enable the user, for example, to move a selected utterance from one cluster to the other cluster, copy a selected utterance from one cluster to the other cluster, and the like.

The ability to work with more than one cluster or call type at the same time also permits the user experience person to develop call types more quickly as utterances can quickly be moved from one cluster to another cluster or call type. Also, relevance feedback or other modules in the annotation module can be used to further refine a cluster or call type after an utterance is moved from one cluster or call type to another.

In this manner, a user experience person can refine a call type more quickly than by manual examination of the speech data. In addition, the annotation guide can be generated automatically and easily improved if necessary. A new call type, for example, can quickly be added or an existing call type can be expanded or become more narrow in scope using the present invention.

As described above, the user experience person (user) typically identifies a relatively large number of utterances that may be included in a particular call type even though only a few of these utterances are typically included in the annotation guide as examples. However, all utterances selected by the user experience person are remembered and stored. These utterances can be used to generate material to test and/or train labelers. These utterances are particularly useful because they have been explicitly identified by the user experience person as belonging to a particular call type. In one embodiment, however, the modules of the annotation module may also be used to select utterances to be used for testing or training the labelers because the annotation module can analyze the speech data to find utterances that are similar to a particular utterance or set of utterances.

FIG. 5 illustrates an exemplary method for monitoring speech data labelers. The labeled utterances 502 include utterances that were identified by a user experience person as being of a particular call type or class. As previously described, a user experience person may identify many utterances that should be included in a particular call type even though all of the identified utterances are not specifically included in the annotation guide. Thus, the labeled utterances 502 are those utterances that have been identified by the user experience person. In another embodiment, the labeled utterances 502 may also include utterances that are similar to the utterances identified by the user experience person. In other words, the labeled utterances 502 used to train and test labelers can include utterances that are selected using the annotation module in the same way it was used by the user experience person to create the annotation guide.

In one embodiment, the labeled utterances 502 can include utterances identified by the relevance feedback module and/or the user experience person that are highly similar to a particular utterance. In another example, the labeled utterances 502 can include marginal utterances that are selected by the active learning module and/or the user experience person.

From the labeled utterances 502, a test is generated (504). The test typically includes test utterances or examples selected from the labeled utterances 502. Then, the labelers are tested (506) using the generated test. The results 508 of the test can also be used as feedback to generate or modify the test (504). For example, if a particular utterance cannot be classified correctly during the testing of the labelers, then the test can be modified according to the testing results to include more utterances that are similar to the utterance that was difficult for the labeler to classify. Alternatively, this type of result can be used to evaluate the existing label of the utterance or to cause the annotation guide to be examined to determine whether sufficient guidance is provided to the labelers to permit them to label the speech data.

In another embodiment, the test results 508 can be used to navigate the test given to the labelers. For example, if a labeler being tested is consistently scoring well with respect to a particular call type, the test may be altered to begin testing the labeler with another call type. Alternatively, if the labeler is unable to identify a particular call type, then the test may be altered to focus more on utterances that are within that call type. The labeled utterances 502 can be actively used to test labelers based on their performance.

FIG. 6 is a block diagram illustrating one embodiment of a testing module for testing labelers. In FIG. 6, the testing module 600 presents a user interface 610 to a labeler. The user interface 610 displays a test utterance 606, an annotation guide 608, a list of call types or classes 604, and a submit button 609. The test utterance 606 is selected from the labeled utterances 602 and displayed to the labeler. The labeler is presented with the classes 604 that are included in the annotation guide 608 and the labeler is asked to select the appropriate class or call type for the test utterance 606. In this example, the labeler can check the checkbox next to a particular call type in the classes 604. The user can submit the selected call type using the submit button 609. Alternatively, checking the checkbox may automatically submit the user's answer.

After the labeler selects a call type for the test utterance and submits the call type, a new test utterance is presented to the labeler. The results 612 indicate whether the label (class/call type) selected by the labeler matches an existing label of the test utterance. In one embodiment, the labeler can assign or select more than one call type for a particular test utterance. During the test, the labeler can use the annotation guide 608 to classify the test utterance 606. In this example, an electronic or digital version of the annotation guide 608 is provided that can be accessed by the labeler. The electronic or digital annotation guide can be a web page that can be accessed remotely or locally. The digital annotation guide can also be a file such as a spreadsheet file, a word processing file, or an XML file. The digital annotation guide can also be accessed from different locations on a network. In another embodiment, the labeler uses a paper or printed annotation guide.

Alternatively, the labeler may be presented with a list of utterances and a test class. In this case, the task of the labeler is to select all of the utterances in the list of utterances that belong to the test class. The results 612 reflect the performance of the labeler with this task. Usually, the annotation guide 608 is available to the labeler and the labeler can consult the annotation guide to help select the utterances that belong in the test class.

The testing module 600 can also be used to train the labelers in a similar manner. The labelers, for example, can take practice tests or cause the testing module 600 to focus on presenting utterances of a particular call type or set of call types such that the labeler can become more familiar with the call types in the annotation guide.

FIG. 7 is a block diagram that illustrates another method for monitoring labelers. FIG. 7 illustrates a labeling module 700 that is used to label the speech data 702. The speech data 702 is unlabeled speech data that is represented by the utterances 704 and 706. The task of the labeler is to use the annotation guide to assign a label (or call type/class) to the utterances in the unlabeled speech data 702.

The labeling module 700 includes a user interface 710 that is similar to the testing user interface previously described. An unlabeled utterance 704 is loaded as the utterance 712 and the labeler uses the annotation guide 714 to select the appropriate class from the available classes 716. When the user has selected one or more classes, the user submits (718) the utterance 712 to the labeled speech data 720. The labeled speech data 720 is used, for example, to train the natural or spoken language understanding models of a dialog application.

In FIG. 7, however, the performance of a labeler can be monitored. In some embodiments, the labeler may not be aware that he or she is being monitored. For example, the labeling module 700 may present a labeled utterance 708 to the labeler instead of an unlabeled utterance from the speech data 702. The labeler classifies the labeled utterance as he or she would classify an unlabeled utterance as described above. However, when the labeler submits (718) the labeled utterance, the label selected by the labeler is compared to the existing label of the utterance and the result is stored in the test results 722.

In this manner, the performance of a labeler can be monitored as the labeler labels the speech data 702. The performance of labelers over time can also be measured. This has the advantage of ensuring that the speech data 702 is being labeled consistently across labelers. Labelers that may require additional training can also be identified according to how they perform. Advantageously, the present invention results in speech data that is more accurately labeled and in better trained natural language models.

Another advantage of the present invention is the ability to indirectly evaluate the annotation guide 714. For example, using the method illustrated in FIG. 7, a labeler may be found to label the speech data correctly ninety percent of the time independent of a particular corpus of speech data and the associated annotation guide. If it is discovered for a particular corpus of speech data that the labeler is only labeling the speech data correctly sixty percent of the time, then this may suggest that the annotation guide is flawed and needs to be revised. Alternatively, the labeler may require more training with that particular annotation guide.

The present invention extends to both methods and systems for monitoring labelers and more particularly to testing and training speech data labelers. The embodiments of the present invention may comprise a special purpose or general-purpose computer including various computer hardware, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

This discussion is intended to provide a brief, general description of a suitable computing environment in which the invention may be implemented. Although not required, the invention is described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a system where an annotation guide is used to label utterances in speech data with a call type, a method for monitoring labelers of the speech data, the method comprising:

presenting a test utterance to a labeler, wherein the test utterance has an existing call type;

receiving input from the labeler that selects a particular call type from a list of call types;

comparing the particular call type selected by the labeler with the existing call type to determine if the labeler labeled the test utterance correctly; and outputting data associated with the determination of whether the labeler labeled the last utterance correctly to improve labeling of speech data.

2. A method as defined in claim 1, wherein presenting a test utterance to a labeler further comprises selecting the test utterance from a group of labeled utterances.

3. A method as defined in claim 2, wherein selecting the test utterance from a group of labeled utterances further comprises generating the group of labeled utterances from utterances identified by a user experience person.

4. A method as defined in claim 2, wherein selecting the test utterance from a group of labeled utterances further comprises generating the group of labeled utterances using an annotation guide.

5. A method as defined in claim 3, wherein generating the group of labeled utterances from utterances identified by a user experience person further comprises storing utterances that are identified by the user experience person as belonging to a particular call type.

6. A method as defined in claim 5, wherein generating the group of labeled utterances from utterances identified by a user experience person further comprises including utterances that are similar to the utterances identified by the user experience person in the group of labeled utterances.

7. A method as defined in claim 1, further comprising storing results, wherein the results represent whether the labeler correctly labeled the test utterance.

8. A method as defined in claim 7, further comprising selecting a new test utterance based on the results.

9. A method as defined in claim 1, further comprising presenting the labeler with additional utterances.

10. A method as defined in claim 1, wherein receiving input from the labeler that selects a particular call type from a list of call types further comprises receiving input from the labeler that selects an additional call type from the list of call types for the test utterance.

11. A computer program product having computer-executable instructions for implementing the method of claim 1.

12. A method for testing a labeler of speech data to increase a likelihood that utterance in the speech data are labeled with a correct call type, the method comprising:
  generating a test that including test utterances for a labeler of speech data, wherein the test utterances are selected from a group of labeled utterances and wherein the test determined if the one or more labelers can correctly label the test utterances with a call type defined by an annotation guide;
  presenting the test to the labeler by displaying a particular call type and a list of test utterances to the labeler;
  receiving input from the user that identifies each utterance from the list of test utterances that belong to the particular call type; and
  outputting test results that indicate whether each utterance selected by the labeler has an existing call type that matches the particular call type, wherein the output test results are used to improve labeling of speech data.

13. A method as defined in claim 12, wherein generating a test that includes test utterances for a labeler of speech data further comprises generating the group of labeled utterances from utterances identified by a user experience person during the developing of the annotation guide.

14. A method as defined in claim 13, wherein generating the group of labeled utterances from utterances identified by a user experience person during the development of the annotation guide further comprises storing the utterances identified by the user experience person developed during the development of the annotation guide, wherein each of the utterances identified by the user experience person are identified as belonging to a particular call type.

15. A method as defined in claim 12, wherein presenting the test to the labeler by displaying a particular call type and a list of test utterances to the labeler further comprises providing the annotation guide to the labeler.

16. A method as defined in claim 12, wherein presenting the test to the labeler by displaying a particular call type and a list of test utterances to the labeler further comprises altering the list of test utterances based on the test results.

17. A method as defined in claim 12, further comprising:
  presenting the test to the labeler by displaying a particular test utterance and a list of call types that are included in the annotation guide;
  receiving input from the labeler that assigns a particular call type from the list of call types to the test utterances; and
  storing additional results that indicate whether the particular call type assigned by the labeler matches an existing call type of the particular test utterance.

18. A computer program product having computer-executable instruction for implementing the method of claim 12.

19. In a system where an annotation guide is used to label utterances in speech data with a call type, a method for monitoring a performance of a labeler while the labeler assigns utterances in the speech data with a call type, the method comprising:
  displaying a list of call types to the labeler, wherein the list of call types is used by a labeler to assign a call type to unlabeled utterances from speech data;
  loading a labeled utterances that has an existing call type instead of an unlabeled utterance from the speech data;
  receiving input from the labeler that assigns a particular call type to the labeled utterance; and
  outputting results that indicate whether the particular call type of the labeled utterance matches the existing call type of the labeled utterance, wherein the output results are used to improve the labeling of utterances.

20. A method as defined in claim 19, wherein displaying a list of call types to the labeler further comprises at least one of:
  providing a digital annotation guide to the labeler, wherein the digital annotation guide is one of a digital document, a spreadsheet, a web page, an XML document, and a word processing document; and
  providing a paper annotation guide to the labeler.

21. A method as defined in claim 19, wherein loading a labeled utterance that has an existing call type further comprises loading the labeled utterance as if it were an unlabeled utterance.

22. A method as defined in claim 19, further comprising:
  loading an unlabeled utterance from the corpus of speech data;
  receiving input from the labeler that assigns at least one call type to the unlabeled utterance such that the unlabeled utterance is labeled; and
  storing the newly labeled utterance with labeled speech data.

23. A method as defined in claim 19, wherein loading a labeled utterance that has an existing call type further comprises:
  generating the labeled utterances from utterances that have been identifies by a user experience person as belonging to a particular call type; and
  generating the labeled utterances by analyzing the corpus of speech data to identify additional utterances that are similar to the labeled utterances.

24. A computer program product having computer-executable instructions for implementing the methods of claim 19.

* * * * *